United States Patent
Lee (10) Patent No.: US 9,175,996 B2
(45) Date of Patent: Nov. 3, 2015

(54) APPARATUS AND METHOD FOR DISPLAYING DISTANCE TO EMPTY OF VEHICLE

(71) Applicants: Hyundai Motor Company, Seoul (KR); Kia Motors Corporation, Seoul (KR)

(72) Inventor: Kang Ho Lee, Incheon (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 14/485,021

(22) Filed: Sep. 12, 2014

(65) Prior Publication Data
US 2015/0185063 A1    Jul. 2, 2015

(30) Foreign Application Priority Data
Dec. 26, 2013  (KR) .................. 10-2013-0163783

(51) Int. Cl.
| | | |
|---|---|---|
| *G06F 19/00* | (2011.01) | |
| *G01F 9/02* | (2006.01) | |
| *B60W 40/12* | (2012.01) | |
| *G06F 7/00* | (2006.01) | |
| *B60L 11/18* | (2006.01) | |
| *B60Q 1/00* | (2006.01) | |
| *B60W 10/24* | (2006.01) | |
| *B60L 1/00* | (2006.01) | |
| *G01M 17/00* | (2006.01) | |
| *B60K 37/02* | (2006.01) | |
| *B60L 11/00* | (2006.01) | |
| *B60W 20/00* | (2006.01) | |

(52) U.S. Cl.
CPC ............... *G01F 9/023* (2013.01); *B60K 37/02* (2013.01); *B60L 1/003* (2013.01); *B60L 11/005* (2013.01); *B60L 11/1838* (2013.01); *B60L 11/1861* (2013.01); *B60L 11/1862* (2013.01); *B60Q 1/00* (2013.01); *B60W 10/24* (2013.01); *B60W 20/00* (2013.01); *B60W 40/12* (2013.01); *G01F 9/02* (2013.01); *G01M 17/00* (2013.01); *G06F 7/00* (2013.01); *G06F 19/00* (2013.01)

(58) Field of Classification Search
CPC . B60L 11/1838; B60L 11/05; B60L 11/1862; B60L 1/03; B60L 11/1861; B60W 20/00; B60W 10/24; B60W 40/12; G06F 19/00; G06F 7/00; G01F 9/023; G01F 9/02; B60K 27/02; G01M 17/00; B60Q 1/00
See application file for complete search history.

(56) References Cited

U.S. PATENT DOCUMENTS

| | | | |
|---|---|---|---|
| 8,521,408 B2 * | 8/2013 | Cho, II | B60L 11/1838 180/65.29 |
| 2012/0143435 A1 * | 6/2012 | Cho, II | B60L 11/1838 701/33.4 |
| 2013/0009765 A1 * | 1/2013 | Gilman | B60L 1/003 340/455 |
| 2015/0051825 A1 * | 2/2015 | Saavedra | G01F 9/023 701/123 |

FOREIGN PATENT DOCUMENTS

| | | |
|---|---|---|
| JP | 4188107 B2 | 11/2008 |
| JP | 2011-102801 A | 5/2011 |
| KR | 10-0569074 B1 | 4/2006 |

* cited by examiner

*Primary Examiner* — Behrang Badii
(74) *Attorney, Agent, or Firm* — McDermott Will & Emery LLP (57) ABSTRACT

A method for displaying a distance to empty (DTE) of a vehicle include calculating an indicated distance to empty based on a learned fuel efficiency which is learned before starting. A target distance to empty is calculated based on an updated learned fuel efficiency which is updated until a present time. A driving mode is determined according to a difference between the indicated distance to empty and the target distance to empty. A final distance to empty is calculated according to the driving mode, and the final distance to empty is displayed.

19 Claims, 6 Drawing Sheets

APPARATUS AND METHOD FOR DISPLAYING DISTANCE TO EMPTY OF VEHICLE

CROSS-REFERENCE TO RELATED APPLICATION

This application claims the benefit of priority to Korean Patent Application No. 10-2013-0163783 filed in the Korean Intellectual Property Office on Dec. 26, 2013, the entire contents of which are incorporated herein by reference.

TECHNICAL FIELD

The present disclosure relates to an apparatus and method for displaying a distance to empty (DTE) of a vehicle. More particularly, the present disclosure relates to an apparatus and method for displaying a distance to empty of a vehicle that displays more correctly by separately calculating an indicated distance to empty and a target distance to empty, applying a driving mode according to a difference between the indicated distance to empty and the target distance to empty, and differentially adding or subtracting a predetermined value depending on the driving mode.

BACKGROUND

Generally a distance to empty (DTE) is calculated by a residual fuel quantity and is displayed on a vehicle cluster.

A method for displaying the distance to empty according to a conventional art detects a residual fuel quantity, and calculates the distance to empty by multiplying the residual fuel quantity and default fuel efficiency.

However, the default fuel efficiency is changed in accordance with a driving condition such as a driving habit of a driver and a state of a road, and thus, the distance to empty calculated on the basis of the default fuel efficiency without considering a change of the driving condition has a great difference with an actual distance to empty.

Therefore, the method for displaying the distance to empty is calculated on the basis of a learned fuel efficiency which is accumulated by a past driving pattern of the driver and averaging the past fuel efficiency for considering the change of the driving condition.

However, in a case that the distance to empty is calculated only on the basis of the learned fuel efficiency, the distance to empty increases or decreases even though the driving pattern is maintained constantly because the learned fuel efficiency changes and an input value of the residual fuel quantity is not linear.

The above information disclosed in this Background section is only for enhancement of understanding of the background of the invention, and therefore, it may contain information that does not form the prior art that is already known in this country to a person of ordinary skill in the art.

SUMMARY

The present disclosure has been made in an effort to provide an apparatus and a method for displaying a distance to empty of a vehicle having advantages of more correctly displaying by separately calculating an indicated distance to empty and a target distance to empty, applying a driving mode according to a difference between the indicated distance to empty and the target distance to empty, and differentially adding or subtracting a predetermined value depending on the driving mode.

According to an exemplary embodiment of the present disclosure, a method for displaying a distance to empty of a vehicle may include calculating an indicated distance to empty based on a learned fuel efficiency learned before starting. A target distance to empty is calculated based on an updated learned fuel efficiency updated until a present time. A driving mode is determined according to a difference between the indicated distance to empty and the target distance to empty. A final distance to empty is calculated according to the driving mode, and the final distance to empty is displayed.

The step of calculating the indicated distance to empty may include detecting a residual fuel quantity. The learned fuel efficiency is calculated before starting the vehicle according to an accumulated driving pattern of a driver. The indicated distance to empty is calculated based on the residual fuel quantity and the learned fuel efficiency.

The step of calculating the target distance to empty may include determining whether the vehicle currently runs. The learned fuel efficiency is updated according to current driving information of the vehicle if the vehicle currently runs. The target distance to empty is calculated based on the updated learned fuel efficiency.

If the vehicle does not currently run, the method may further include applying a stopping mode that calculates a final distance to empty based on a default fuel efficiency and a fuel consumption quantity while the vehicle stops.

The current driving information of the vehicle may be determined by a vehicle speed and a fuel consumption quantity.

The final distance to empty may be calculated by differentially adding or subtracting a predetermined value depending on each driving mode.

After calculating the final distance to empty, the method may further include determining a minimum value of the indicated distance to empty as the final distance to empty if the final distance to empty is less than the minimum value of the indicated distance to empty.

After calculating the final distance to empty, the method may further include determining a maximum value of the indicated distance to empty as the final distance to empty if the final distance to empty is greater than or equal to the maximum value of the indicated distance to empty after calculating the final distance to empty.

According to another exemplary embodiment of the present disclosure, an apparatus for displaying a distance to empty of a vehicle that may include a fuel amount detector configured to detect a residual fuel quantity of a fuel tank. A vehicle information detector is configured to detect a running state of the vehicle. A driving pattern map storage is configured to check an accumulated driving pattern of a driver. A distance to empty calculator is configured to calculate a final distance to empty by calculating an indicated distance to empty and a target distance to empty by receiving a signal from the fuel amount detector, the vehicle information detector, and the driving pattern map storage. A driving mode is determined according to a difference between the indicated distance to empty and the target distance to empty. A display is configured to display a signal of the final distance to empty output from the distance to empty calculator in figures.

The vehicle information detector may include a vehicle speed sensor configured to detect a vehicle speed and a fuel consumption quantity detector configured to detect a fuel consumption quantity according to the vehicle speed.

The distance to empty calculator may calculate the final distance to empty based on a default fuel efficiency and a fuel consumption quantity while the vehicle stops.

The indicated distance to empty may be calculated by a residual fuel quantity and a learned fuel efficiency according to the accumulated driving pattern of the driver, and the target distance to empty may be calculated by updating the learned fuel efficiency according to current driving information of the vehicle if the vehicle currently runs.

The distance to empty calculator may calculate the final distance to empty by differentially adding or subtracting a predetermined value depending on each driving mode.

The distance to empty calculator may determine a minimum value of the indicated distance to empty as the final distance to empty if the final distance to empty is less than the minimum value of the indicated distance to empty after calculating the final distance to empty and a maximum value of the indicated distance to empty as the final distance to empty if the final distance to empty is greater than or equal to the maximum value of the indicated distance to empty after calculating the final distance to empty.

According to the present disclosure as described above, noise due to a change of fuel amount and a driving condition of the driver is removed and linearity of the distance to empty is improved. Thus, a phenomenon that the distance to empty unexpectedly increases or decreases can be prevented and can be more correctly displayed.

DETAILED DESCRIPTION

In the following detailed description, only certain exemplary embodiments of the present disclosure have been shown and described, simply by way of illustration. As those skilled in the art would realize, the described embodiments may be modified in various different ways, all without departing from the spirit or scope of the present disclosure.

Throughout this specification and the claims which follow, unless explicitly described to the contrary, the word "comprise" and variations such as "comprises" or "comprising" will be understood to imply the inclusion of stated elements but not the exclusion of any other elements.

Like reference numerals designate like elements throughout the specification.

An exemplary embodiment of the present disclosure will hereinafter be described in detail with reference to the accompanying drawings.

Figure 1:
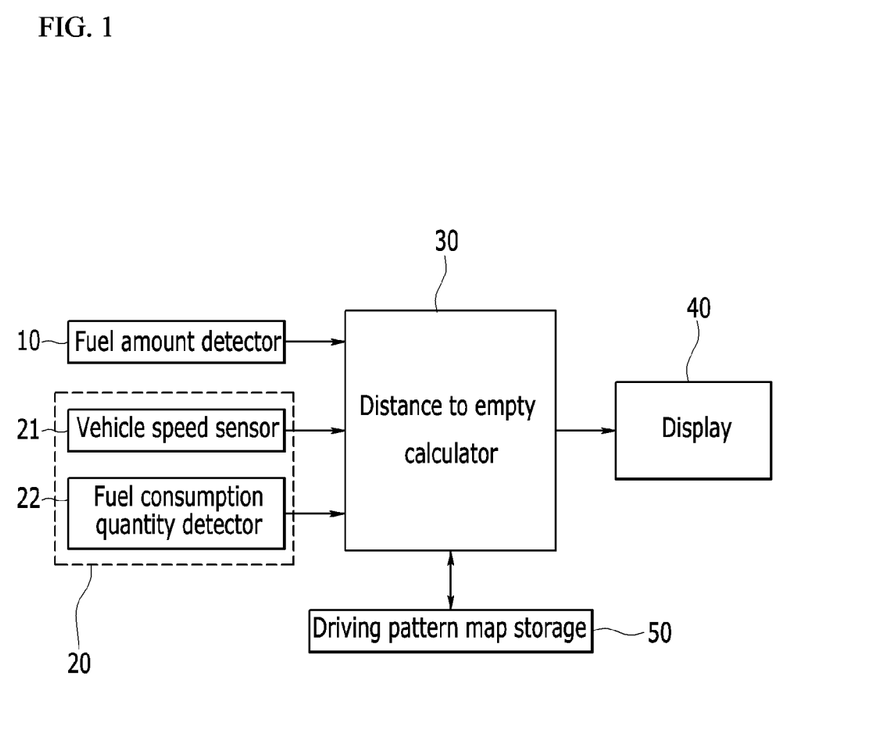
FIG. 1 is a block diagram of an apparatus for displaying a distance to empty of a vehicle according to an exemplary embodiment of the present disclosure.

FIG. 1 is a block diagram of an apparatus for displaying a distance to empty of a vehicle according to an exemplary embodiment of the present disclosure.

As shown in FIG. 1, an apparatus for displaying a distance to empty (DTE) according to an exemplary embodiment of the present disclosure includes a fuel amount detector 10, a vehicle information detector 20, a distance to empty calculator 30, a display 40, and driving pattern map storage 50.

The fuel amount detector 10 includes a float (not shown) that moves up and down according to a fuel amount in a fuel tank of the vehicle, and a variable resistor (not shown) that changes a resistance value according to movement of the float. Thus, the fuel amount detector 10 detects a residual fuel quantity of the fuel tank and transmits a detected signal of the residual fuel quantity to the distance to empty calculator 30.

The vehicle information detector 20 includes a vehicle speed sensor 21 and a fuel consumption quantity detector 22. The vehicle information detector 20 may receive a signal of a vehicle speed from the vehicle speed sensor 21 and a signal of a fuel consumption quantity injected into an engine cylinder from a fuel consumption quantity detector 22.

The fuel consumption quantity detector 22 may include a throttle valve position sensor (TPS) which measures an opening degree of a throttle valve. Generally, a fuel amount injected into the engine cylinder is determined by an operation state of the engine, so the fuel consumption quantity may be calculated at an electronic control unit (ECU) by measuring an amount of intake air drawn into the engine at the TPS. Therefore, throughout this specification, the fuel consumption quantity detector 22 should be understood to be all of means that can calculate or confirm the fuel amount injected into the engine cylinder.

The vehicle information detector 20 transmits signals received from the vehicle speed sensor 21 and the fuel consumption quantity detector 22 to the distance to empty calculator 30.

The distance to empty calculator 30 receives information of the vehicle from the fuel amount detector 10 and the vehicle information detector 20, calculates a target distance to empty and an indicated distance to empty, calculates a final distance to empty by determining a driving mode according to a difference between the indicated distance to empty and the target distance to empty, and outputs a numerical value of the final distance to empty to the display 40.

In addition, the distance to empty calculator 30 determines the driving mode by using information transmitted from the vehicle information detector 20, calculates the final distance to empty, and then generates a driving pattern map and stores the driving pattern map in the driving pattern map storage 50. Therefore, the distance to empty calculator 30 may calculate a learned fuel efficiency by using an accumulated driving pattern of the driver stored in the driving pattern map storage 50.

To this end, the distance to empty calculator 30 may be implemented as at least one processor that is operated by a predetermined program, and the predetermined program may be programmed in order to perform each step of a method for displaying a distance to empty of a vehicle according to an exemplary embodiment of the present disclosure.

The display 40 displays a signal of the final distance to empty output from the distance to empty calculator 30. The display 40 is mounted on a cluster in front of the driver or is included in another display device.

Hereinafter, referring to FIGS. 2 to 6, a method for displaying a distance to empty of a vehicle according to an exemplary embodiment of the present disclosure will be described in detail.

Figure 2:
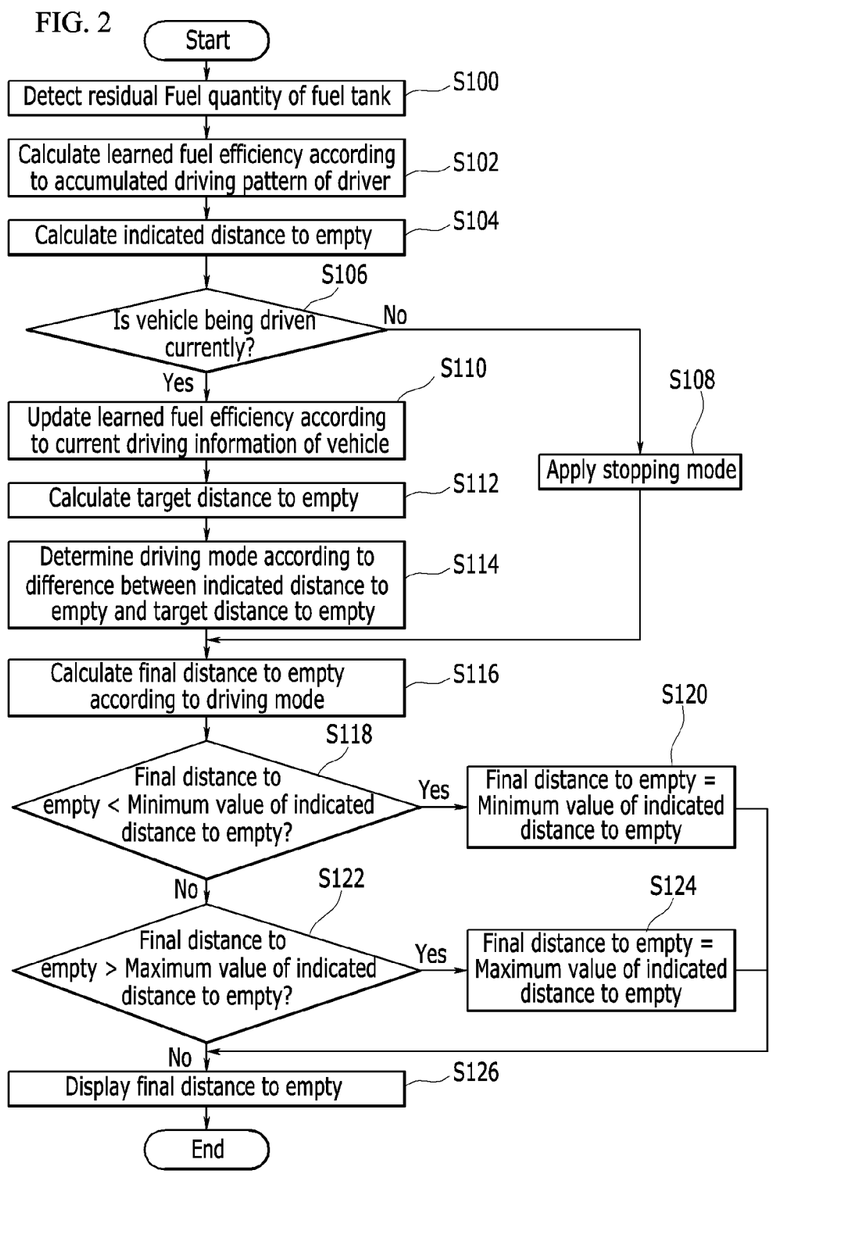
FIG. 2 is a flowchart showing a method for displaying a distance to empty of a vehicle according to an exemplary embodiment of the present disclosure.

FIG. 2 is a flowchart showing a method for displaying a distance to empty of a vehicle according to an exemplary embodiment of the present disclosure.

As shown in FIG. 2, a method for displaying a distance to empty of a vehicle according to an exemplary embodiment of the present disclosure starts with the fuel amount detector 10 detecting a residual fuel quantity of a fuel tank at step S100.

When the fuel amount detector 10 detects a residual fuel quantity of the fuel tank, the distance to empty calculator 30 calculates a learned fuel efficiency according to an accumulated driving pattern of a driver at step S102.

The distance to empty calculator 30 receives information about the accumulated driving pattern of the driver from the driving pattern map storage 50 in order to calculate the learned fuel efficiency according to the accumulated driving pattern of the driver.

After that, the distance to empty calculator 30 calculates an indicated distance to empty at step S104. The indicated distance to empty may be calculated by multiplying the residual fuel quantity by the learned fuel efficiency learned before starting.

The indicated distance to empty may be a distance that is initially displayed on the display 40 when an ignition switch of the vehicle is turned on. For this purpose, the distance to empty calculator 30 may output a signal of the indicated distance to empty to the display 40, and the display 40 may display the signal of the indicated distance to empty as in figures.

When the distance to empty calculator 30 calculates the indicated distance to empty at step S104, the distance to empty calculator 30 determines whether the vehicle is currently running at step S106.

If the vehicle is not currently running at step S106, the distance to empty calculator 30 applies a stopping mode at step S108. The process then proceeds to step S116, so the distance to empty calculator 30 calculates a final distance to empty according to the stopping mode. The distance to empty calculator 30 may calculate the final distance to empty based on a default fuel efficiency and a fuel consumption quantity while the vehicle stops in the stopping mode.

The final distance to empty applied in the stopping mode may be calculated by subtracting a value of the default fuel consumption multiplied by the fuel consumption quantity while the vehicle stops from the indicated distance to empty.

Contrary to this, if the vehicle is currently running at step S106, the distance to empty calculator 30 updates the learned fuel efficiency according to current driving information of the vehicle transmitted from the vehicle information detector 20 at step S110.

The learned fuel efficiency may be updated by calculating a fuel efficiency of each predetermined renewal distance (for example, 100 m) with a constant weight value.

When the learned fuel efficiency is updated at step S110, the distance to empty calculator 30 calculates a target distance to empty at step S112.

The target distance to empty may be calculated by multiplying the updated learned fuel efficiency at step S110 by the residual fuel quantity detected at step S100.

When the indicated distance to empty is calculated at step S104, and the target distance to empty is calculated at step S112, the distance to empty calculator 30 determines a driving mode according to a difference between the indicated distance to empty and the target distance to empty at step S114.

The driving mode may be classified into an increasing mode, a maintaining mode, a decreasing mode, and a jumping mode according to the difference between the indicated distance to empty and the target distance to empty.

For example, the increasing mode may be set as a section in which the difference between the indicated distance to empty and the target distance to empty is greater than or equal to 20 km. Thus, the final distance to empty may be increased by adding a predetermined distance according the difference between the indicated distance to empty and the target distance to empty in the increasing mode.

The maintaining mode may be set as a section in which the difference between the indicated distance to empty and the target distance to empty is greater than or equal to 0 km and less than 20 km. Thus, the final distance to empty may be maintained as the target distance to empty.

The decreasing mode may be set as a section in which the difference between the indicated distance to empty and the target distance to empty is greater than or equal to −100 km and less than 0 km. Thus, the final distance to empty may be decreased by subtracting a predetermined distance according the difference between the indicated distance to empty and the target distance to empty in the decreasing mode.

The jumping mode may be set as a section in which the difference between the indicated distance to empty and the target distance to empty is less than −100 km. Thus, the final distance to empty may be calculated by subtracting a maximum error distance (for example, 10 km) according to the difference between the indicated distance to empty and the target distance to empty.

When the driving mode is determined according to the difference between the indicated distance to empty and the target distance to empty at step S114, the distance to empty calculator 30 calculates the final distance to empty according to the driving mode at step S116.

That is, the distance to empty calculator 30 calculates the final distance to empty by differentially adding or subtracting a predetermined value depending on the driving mode.

When the final distance to empty is calculated, the process for comparing the final distance to empty with a maximum value and a minimum value of the indicated distance to empty in order to more correctly calculate the final distance to empty is performed.

Figure 3:
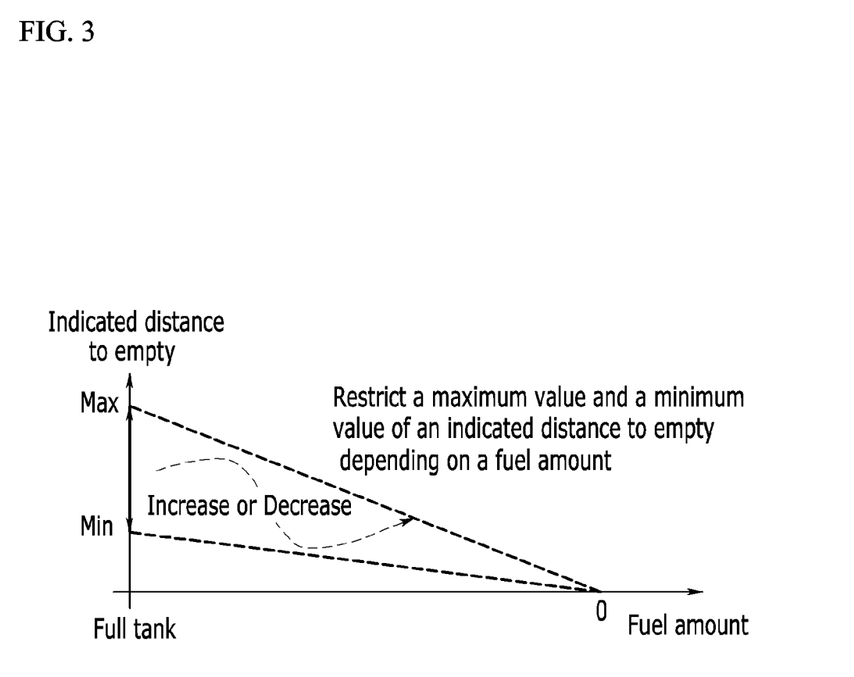
FIG. 3 is a graph showing a method of restricting a maximum value and a minimum value of an indicated distance to empty depending on a fuel amount.

FIG. 3 is a graph showing a method of restricting a maximum value and a minimum value of an indicated distance to empty depending on a fuel amount.

As illustrated by a dotted line in FIG. 3, the indicated distance to empty is restricted to a maximum value and a minimum value depending on a fuel amount corresponding to a maximum value and a minimum value of a predetermined fuel efficiency.

The method for displaying the distance to empty of the vehicle according to an exemplary embodiment of the present disclosure calculates the final distance to empty by adding or subtracting the predetermined value in which the fuel efficiency changes sharply, and thus the final distance to empty may become greater than the maximum value of the indicated distance to empty or smaller than the minimum value of the indicated distance to empty.

Therefore, the method for displaying the distance to empty of the vehicle according to an exemplary embodiment of the present disclosure performs step S118 where the distance to empty calculator 30 determines whether the final distance to empty is less than the minimum value of the indicated distance to empty and step S122 where the distance to empty calculator 30 determines whether the final distance to empty is greater than the maximum value of the indicated distance to empty.

When the final distance to empty is less than the minimum value of the indicated distance to empty at step S118, the distance to empty calculator 30 determines the minimum value of the indicated distance to empty as the final distance to empty at step S120. In addition, when the final distance to empty is greater than the maximum value of the indicated distance to empty at step S122, the distance to empty calculator 30 determines the maximum value of the indicated distance to empty as the final distance to empty at step S124.

That is, if the final distance to empty calculated at step S116 is greater than the minimum value of the indicated distance to empty and less than the maximum value of the indicated distance to empty, the process proceeds to step S126 for displaying the final distance to empty on the display 40.

On the other hand, if step S120 or step S124 is performed, the final distance to empty is determined as the minimum value or maximum value of the indicated distance to empty. Thus, the minimum value or maximum value of the indicated distance to empty is displayed on the display 40 at step S126.

Figure 4:
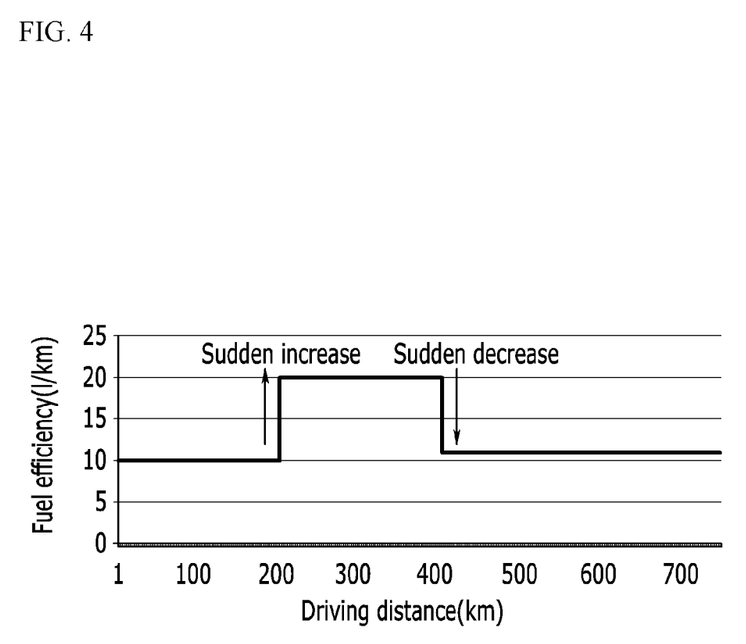
FIG. 4 is a graph showing a change of fuel efficiency according to a driving distance.
Figure 5:
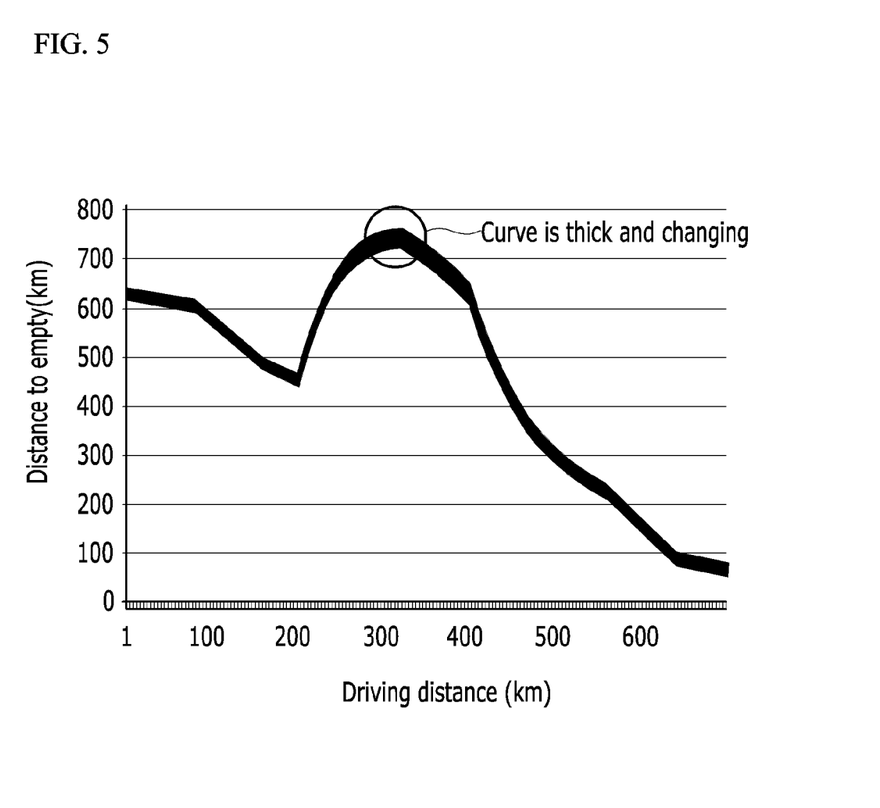
FIG. 5 is a graph showing a relationship between a distance to empty and a driving distance illustrated in FIG. 4 according to a conventional art.
Figure 6:
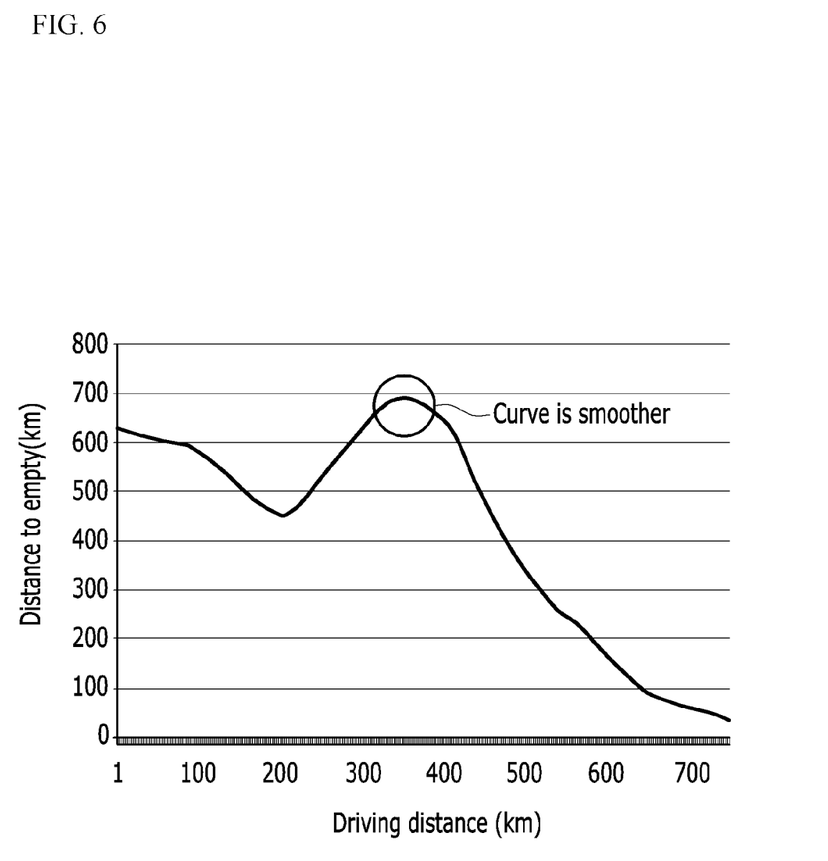
FIG. 6 is a graph showing a relationship between a distance to empty and a driving distance illustrated in FIG. 4 according to an exemplary embodiment of the present disclosure.

FIG. 4 is a graph showing a change of fuel efficiency according to a driving distance, and FIG. 5 is a graph showing a relationship between a distance to empty and a driving distance illustrated in FIG. 4 according to a conventional art. FIG. 6 is a graph showing a relationship between a distance to empty and a driving distance illustrated in FIG. 4 according to an exemplary embodiment of the present disclosure.

A region in which the fuel efficiency suddenly increases and decreases while driving the vehicle in FIG. 4 according to the conventional art is illustrated as a thick, changing curve from 200 km to 400 km in FIG. 5. That is, an error range becomes bigger as the curve becomes thicker, thus incorrectly displaying the distance to empty.

Contrary to this, according to the exemplary embodiment of the present disclosure, the curve is smoother as shown in FIG. 6 even though the fuel efficiency suddenly increases and decreases from 200 km to 400 km. Therefore, a phenomenon in which the distance to empty increases or decreases unexpectedly can be prevented, and the distance to empty can be more correctly displayed.

While this disclosure has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A method for displaying a distance to empty of a vehicle, comprising steps of:
    calculating an indicated distance to empty based on a learned fuel efficiency which is obtained before starting;
    calculating a target distance to empty based on an updated learned fuel efficiency which is updated until a present time;
    determining a driving mode according to a difference between the indicated distance to empty and the target distance to empty;
    calculating a final distance to empty according to the driving mode; and
    displaying the final distance to empty.

2. The method of claim 1, wherein the step of calculating the indicated distance to empty comprises:
    detecting a residual fuel quantity;
    calculating the learned fuel efficiency before the vehicle starts according to an accumulated driving pattern of a driver; and
    calculating the indicated distance to empty based on the residual fuel quantity and the learned fuel efficiency.

3. The method of claim 1, wherein step of calculating the target distance to empty comprises:
    determining whether the vehicle currently runs;
    updating the learned fuel efficiency according to current driving information of the vehicle if the vehicle currently runs; and
    calculating the target distance to empty based on the updated learned fuel efficiency.

4. The method of claim 3, if the vehicle does not currently runs, the method further comprises a step of applying a stopping mode that calculates the final distance to empty based on a default fuel efficiency and a fuel consumption quantity while the vehicle stops.

5. The method of claim 3, wherein the current driving information of the vehicle is determined by a vehicle speed and a fuel consumption quantity.

6. The method of claim 1, wherein the final distance to empty is calculated by adding or subtracting a predetermined value differentially depending on each driving mode.

7. The method of claim 1, further comprising a step of determining a minimum value of the indicated distance to empty as the final distance to empty if the final distance to empty is less than the minimum value of the indicated distance to empty after the step of calculating the final distance to empty.

8. The method of claim 1, further comprising a step of determining a maximum value of the indicated distance to empty as the final distance to empty if the final distance to empty is greater than or equal to the maximum value of the indicated distance to empty after the step of calculating the final distance to empty.

9. An apparatus for displaying a distance to empty of a vehicle, comprising:
    a fuel amount detector configured to detect a residual fuel quantity of a fuel tank;
    a vehicle information detector configured to detect a running state of the vehicle;
    a driving pattern map storage configured to check an accumulated driving pattern of a driver;
    a distance to empty calculator configured to calculate a final distance to empty by calculating an indicated distance to empty and a target distance to empty by receiving a signal from the fuel amount detector, the vehicle information detector, and the driving pattern map storage and determining a driving mode according to a difference between the indicated distance to empty and the target distance to empty; and
    a display configured to display the signal of the final distance to empty output from the distance to empty calculator.

10. The apparatus of claim 9, wherein the vehicle information detector comprises a vehicle speed sensor configured to detect a vehicle speed and a fuel consumption quantity detector configured to detect a fuel consumption quantity according to the vehicle speed.

11. The apparatus of claim 9, wherein the distance to empty calculator calculates the final distance to empty based on a default fuel efficiency and a fuel consumption quantity while the vehicle stops.

12. The apparatus of claim 9, wherein the indicated distance to empty is calculated by the residual fuel quantity and a learned fuel efficiency according to the accumulated driving pattern of the driver.

13. The apparatus of claim 9, wherein the target distance to empty is calculated by updating the learned fuel efficiency according to current driving information of the vehicle if the vehicle currently runs.

14. The apparatus of claim 9, wherein the distance to empty calculator calculates the final distance to empty by differentially adding or subtracting a predetermined value depending on each driving mode.

15. The apparatus of claim 9, wherein the distance to empty calculator determines a minimum value of the indicated distance to empty as the final distance to empty if the final distance to empty is less than the minimum value of the indicated distance to empty after calculating the final distance to empty.

16. The apparatus of claim 9, wherein the distance to empty calculator determines a maximum value of the indicated distance to empty as the final distance to empty if the final distance to empty is greater than or equal to the maximum value of the indicated distance to empty after calculating the final distance to empty.

17. The apparatus of claim 9, wherein the display displays the signal of the final distance to empty output in figures.

18. The apparatus of claim 10, wherein the fuel consumption quantity detector includes a throttle valve position sensor (TPS) which measures an opening degree of a throttle valve.

19. A non-transitory computer-readable medium including instructions execution of which causes a controller to perform the steps of claim 1.

* * * * *